United States Patent
Beye et al.

(10) Patent No.: US 12,211,218 B2
(45) Date of Patent: Jan. 28, 2025

(54) VISUAL OBJECT TRACKING METHOD, VISUAL OBJECT TRACKING SYSTEM, MACHINE LEARNING METHOD, AND LEARNING SYSTEM

(71) Applicant: NEC Corporation, Tokyo (JP)

(72) Inventors: Florian Beye, Tokyo (JP); Takanori Iwai, Tokyo (JP); Yusuke Shinohara, Tokyo (JP); Hayato Itsumi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 385 days.

(21) Appl. No.: 17/765,946

(22) PCT Filed: Oct. 7, 2019

(86) PCT No.: PCT/JP2019/039513
§ 371 (c)(1),
(2) Date: Apr. 1, 2022

(87) PCT Pub. No.: WO2021/070228
PCT Pub. Date: Apr. 15, 2021

(65) Prior Publication Data
US 2022/0375189 A1    Nov. 24, 2022

(51) Int. Cl.
*G06T 7/246* (2017.01)
*G06V 10/20* (2022.01)
(Continued)

(52) U.S. Cl.
CPC ............ *G06T 7/246* (2017.01); *G06V 10/255* (2022.01); *G06V 20/00* (2022.01); *G06T 2207/20081* (2013.01); *G06V 10/62* (2022.01)

(58) Field of Classification Search
CPC ........... G06T 7/246; G06T 2207/20081; G06T 2207/10016; G06V 10/255; G06V 20/00; G06V 10/62
(Continued)

(56) References Cited

U.S. PATENT DOCUMENTS

| 11,775,617 B1 * | 10/2023 | Jaiswal ............... G06V 10/454 |
| 2021/0089841 A1 | 3/2021 | Mithun et al. |
| 2021/0350516 A1 * | 11/2021 | Tang ...................... G06F 16/93 |

FOREIGN PATENT DOCUMENTS

| CN | 109117831 | * 10/2021 | ............. G06V 20/10 |
| KR | 102269750 | * 6/2021 | ............... G06T 7/11 |

(Continued)

OTHER PUBLICATIONS

International Search Report for PCT Application No. PCT/JP2019/039513, mailed on Dec. 10, 2019.
(Continued)

*Primary Examiner* — Jerome Grant, II

(57) ABSTRACT

An estimation unit of a visual object tracking apparatus estimates a plurality of estimated bounding boxes and estimated object IDs respectively corresponding to the estimated bounding boxes based on a plurality of predicted bounding boxes and a plurality of detected bounding boxes. For example, the "detected bounding boxes" are "bounding boxes (bounded areas)" detected by a detector in each of a plurality of frames in a time series such as moving images. The "bounding box" is a frame surrounding an image of an object detected in a frame. For example, the "predicted bounding box" is a "bounding box" predicted by a predictor based on an estimated bounding box(es) estimated for one or a plurality of frames in the past.

11 Claims, 9 Drawing Sheets

(51) Int. Cl.
 *G06V 20/00* (2022.01)
 *G06V 10/62* (2022.01)
(58) Field of Classification Search
 USPC .......................................................... 382/103
 See application file for complete search history.

(56) References Cited

FOREIGN PATENT DOCUMENTS

| WO | 2019/162241 A1 | 8/2019 | |
|---|---|---|---|
| WO | WO2021070228 | * 4/2021 | ............... G06T 7/00 |

OTHER PUBLICATIONS

E. Bochinski, V. Elselein, T. Sikora. "High-Speed Tracking-by-Detection Without Using Image Information". In International Workshop on Traffic and Street Surveillance for Safety and Security at IEEE AVSS 2017. Aug. 2017, pp. 1-6.

Ujiie. T., et al., "Interpolation-based Object Detection Using Motion Vectors for Embedded Real-time Tracking Systems". Proceedings of the 2018 IEEE/CVF Conference on Computer Vision and Pattern Recognition Workshops (CVPRW), Jun. 22, 2018, pp. 1-10.

Ujiie, T., et al., "Load Mitigation of CNN-Based Object Detection Utilizing Motion Vectors in Video Codecs", IPSJ SIG Technical Report, vol. 2018-CVIM-210, No. 4, Jan. 11, 2018, pp. 1-10.

Quang Dao Vu, et al., "Real-Time Robust Human Tracking based on Lucas-Kanade Optical Flow and Deep Detection for Embedded Surveillance", Proceedings of the 2017 8th International Conference of Information and Communication Technology for Embedded Systems (IC-ICTES). May 9, 2017, pp. 1-7.

* cited by examiner

VISUAL OBJECT TRACKING METHOD, VISUAL OBJECT TRACKING SYSTEM, MACHINE LEARNING METHOD, AND LEARNING SYSTEM

This application is a National Stage Entry of PCT/JP2019/039513 filed on Oct. 7, 2019, the contents of all of which are incorporated herein by reference, in their entirety.

TECHNICAL FIELD

The present disclosure relates to a visual object tracking method, a visual object tracking system, a machine learning method, and a learning system.

BACKGROUND ART

Techniques for visually tracking a plurality of objects have been proposed (see, for example, Non-patent Literature 1). In the technique disclosed in Non-patent Literature 1, an object is visually tracked by associating images of the object detected in image frames based on IoU (Intersection-over-Union).

CITATION LIST

Non Patent Literature

NPL 1: E. Bochinski, V. Eiselein, T. Sikora. "High-Speed Tracking by Detection Without Using Image Information". In International Workshop on Traffic and Street Surveillance for Safety and Security at IEEE AVSS 2017, 2017.

SUMMARY OF INVENTION

Technical Problem

The technique disclosed in Non-patent Literature 1 is based on the assumption that the detection accuracy of the detector is high. Meanwhile, in some cases, an object detector with low computational requirements (a lightweight object detector) is required due to the cost or the real-time constraints.

However, since the detection accuracy of such a lightweight object detector is usually low, there is a possibility that the tracking accuracy deteriorates in the technique disclosed in Non-patent Literature 1.

An objective of the present disclosure is to provide a visual object tracking method, a visual object tracking system, a machine learning method, and a machine learning system capable of improving tracking accuracy.

Solution to Problem

A visual object tracking method according to a first aspect includes estimating a plurality of estimated bounding boxes and estimated object IDs respectively corresponding to the estimated bounding boxes based on a plurality of predicted bounding boxes each having a corresponding object ID, and a plurality of detected bounding boxes.

A visual object tracking system according to a second aspect includes estimation means configured to estimate a plurality of estimated bounding boxes and estimated object IDs respectively corresponding to the estimated bounding boxes based on a plurality of predicted bounding boxes each having a corresponding object ID, and a plurality of detected bounding boxes.

A machine learning method according to a third aspect is a machine learning method for training an evaluation model for predicted bounding boxes and detected bounding boxes,
in which the evaluation model receives a first set including a plurality of predicted bounding boxes each having a corresponding object ID and a plurality of predicted feature vectors respectively corresponding to the plurality of predicted bounding boxes, and a second set including a plurality of detected bounding boxes and a plurality of detected feature vectors respectively corresponding to the plurality of detected bounding boxes, and generates a prediction confidence vector for each of the predicted bounding boxes, a detection confidence vector for each of the detected bounding boxes, and an association weight matrix, the association weight matrix including association weights respectively corresponding to pairs of predicted bounding boxes and detected bounding boxes, and in which the machine learning method includes:
obtaining the second set obtained based on a group of teacher images and the first set obtained based on a plurality of correct bounding boxes corresponding to the group of teacher images;
specifying, based on the first set and the second set, a pair of a predicted bounding box and a detected bounding box both of which match the same correct bounding box, a predicted bounding box matching a correct bounding box which does not match any detected bounding box, and a detected bounding box matching a correct bounding box which does not match any predicted bounding box;
generating a correct association weight matrix, a correct prediction confidence vector, and a correct detection confidence vector based on the specified pair, the specified predicted bounding box, and the specified detected bounding box;
calculating a deviation index indicating a deviation level between a group of the prediction confidence vector, the detection confidence vector, and the association weight matrix output from the evaluation model, and a group of the correct prediction confidence vector, the correct detection confidence vector, and the correct association weight matrix based on the first set and the second set; and
adjusting a parameter of the evaluation model based on the deviation index.

A machine learning system according to a fourth aspect is a machine learning system configured to train an evaluation model for predicted bounding boxes and detected bounding boxes,
in which the evaluation model receives a first set including a plurality of predicted bounding boxes each having a corresponding object ID and a plurality of predicted feature vectors respectively corresponding to the plurality of predicted bounding boxes, and a second set including a plurality of detected bounding boxes and a plurality of detected feature vectors respectively corresponding to the plurality of detected bounding boxes, and generates a prediction confidence vector for each of the predicted bounding boxes, a detection confidence vector for each of the detected bounding boxes, and an association weight matrix, the association weight matrix including association weights respectively corresponding to pairs of predicted bounding boxes and detected bounding boxes, and in which the machine learning system includes: prediction means; detection means; correct answer generation means; deviation index calculation means; and optimization means, in which the detection means outputs, to the evaluation model and the correct answer generation means, the second set obtained based on a group of teacher images, the prediction means outputs, to the evaluation model and the correct answer generation means, the first set obtained based on a plurality of correct bounding boxes corresponding to the group of teacher images, the correct answer generation means specifies a pair of a predicted bounding box and a detected bounding box both of which match the same correct bounding box, a predicted bounding box matching a correct bounding box which does not match any detected bounding box, and a detected bounding box matching a correct bounding box which does not match any predicted bounding box, and generates a correct association weight matrix, a correct prediction confidence vector, and a correct detection confidence vector based on the specified pair, the specified predicted bounding box, and the specified detected bounding box, the deviation index calculation means calculates a deviation index indicating a deviation level between a group of the prediction confidence vector, the detection confidence vector, and the association weight matrix output from the evaluation model, and a group of the correct prediction confidence vector, the correct detection confidence vector, and the correct association weight matrix based on the first set and the second set; and the optimization means adjusts a parameter of the evaluation model based on the deviation index.

Advantageous Effects of Invention

According to the present disclosure, it is possible to provide a visual object tracking method, a visual object tracking system, a machine learning method, and a machine learning system capable of improving tracking accuracy.

DESCRIPTION OF EMBODIMENTS

Figure 1:
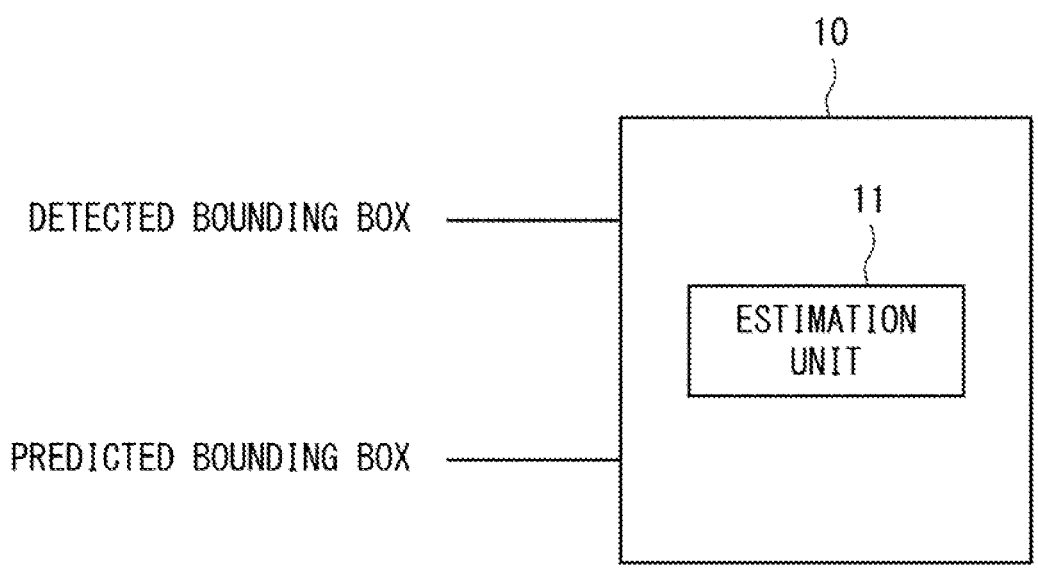
FIG. 1 is a block diagram showing an example of a visual object tracking apparatus (a visual object tracking system) according to a first example embodiment.

Example embodiments will be described hereinafter with reference to the drawings. Note that in the example embodiments, the same or equivalent elements are denoted by the same reference numerals and redundant descriptions are omitted.

First Example Embodiment

FIG. 1 is a block diagram showing an example of a visual object tracking apparatus (a visual object tracking system) according to a first example embodiment. In FIG. 1, a visual object tracking apparatus 10 includes an estimation unit 11.

The estimation unit 11 receives a plurality of "predicted bounding boxes" and a plurality of "detected bounding boxes". A corresponding object ID (IDentifier) is assigned to each of the plurality of "predicted bounding boxes". Further, the estimation unit 11 estimates a plurality of "estimated bounding boxes" and a plurality of "estimated object IDs" respectively corresponding to the estimated bounding boxes based on the plurality of predicted bounding boxes and the plurality of detected bounding boxes.

For example, the "detected bounding boxes" are "bounding boxes (bounded areas)" detected by a detector (not shown) in each of a plurality of frames in a time series such as moving images. The "bounding box" is an enclosing line surrounding an image of an object detected in a frame.

Further, for example, the "predicted bounding box" is a "bounding box" predicted by a predictor (not shown) based on an estimated bounding box(es) estimated for one or a plurality of frames in the past.

For example, a timing at which a detected bounding box for an nth frame is input to the estimation unit 11 is defined as a timing Tn. At this timing Tn, a predicted bounding box for the nth frame predicted by the predictor (not shown) based on an "estimated bounding box" estimated for one or a plurality of frames at or before the (n−1)th frame is also input to the estimation unit 11. That is, in this case, the predicted bounding box is the bounding box for the nth frame predicted based on the past trajectory of bounding boxes corresponding to the same ID.

As described above, according to the first example embodiment, the estimation unit 11 of the visual object tracking apparatus 10 estimates a plurality of estimated bounding boxes and estimated object IDs respectively corresponding to the estimated bounding boxes based on a plurality of predicted bounding boxes and a plurality of detected bounding boxes.

By the above-described configuration of the visual object tracking apparatus 10, estimated bounding boxes and estimated object IDs are estimated based on predicted bounding boxes as well as detected bounding boxes, so that the tracking accuracy can be improved.

Second Example Embodiment

Figure 2:
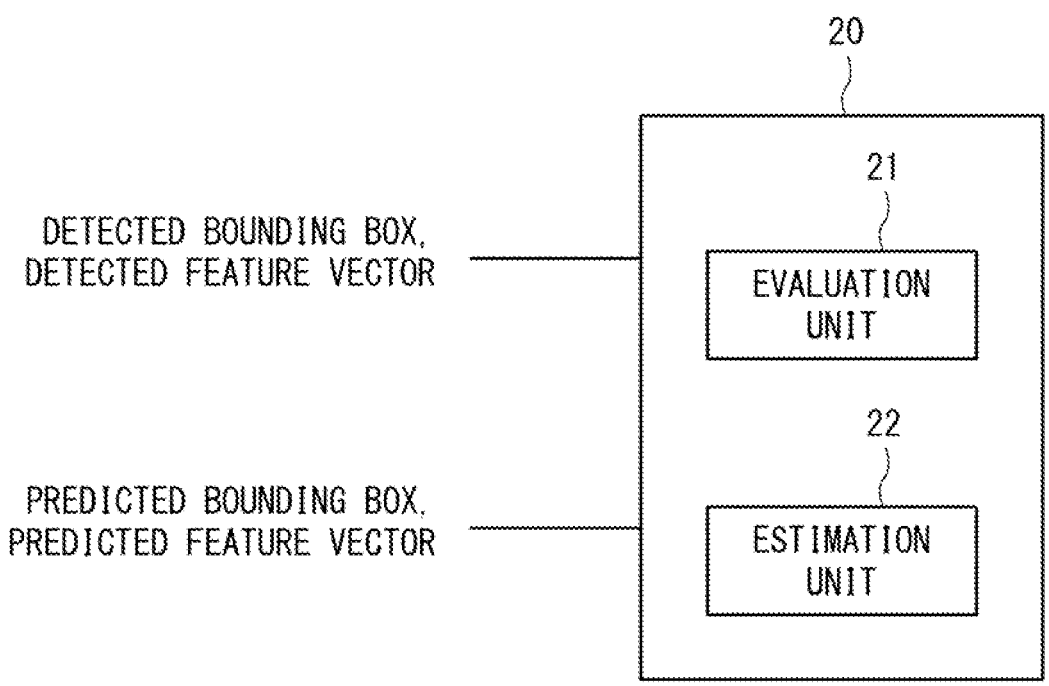
FIG. 2 is a block diagram showing an example of a visual object tracking apparatus (a visual object tracking system) according to the first example embodiment.

FIG. 2 is a block diagram showing an example of a visual object tracking apparatus (a visual object tracking system)

according to the first example embodiment. In FIG. 2, a visual object tracking apparatus 20 includes an evaluation unit 21 and an estimation unit 22.

The evaluation unit 21 receives a set of a plurality of "predicted bounding boxes" and a plurality of "predicted feature vectors" respectively corresponding to the plurality of predicted bounding boxes (hereinafter also referred to as a "first set"). A corresponding object ID (IDentifier) is assigned to each of the plurality of "predicted bounding boxes". Further, the evaluation unit 21 receives a set of a plurality of "detected bounding boxes" and a plurality of "detected feature vectors" respectively corresponding to the plurality of detected bounding boxes (hereinafter also referred to as a "second set").

For example, the "detected bounding boxes" and the "detected feature vectors" are "bounding boxes (bounded areas)" and "feature vectors", respectively, detected by a detector (not shown) in each of a plurality of frames in a time series such as a moving images. The "feature vector" may be, for example, a vector having, as its components, feature values (e.g., HOG (Histograms of Oriented Gradients) feature values, color distribution feature values, or other feature values corresponding to features learnt by a deep neural network etc.) of an image in the corresponding bounding box.

Further, for example, the "predicted bounding box" and the "predicted feature vector" are a "bounding box" and a "feature vector", respectively, predicted by a predictor (not shown) based on at least an "estimated bounding box" and an "estimated feature vector" estimated for one or a plurality of frames in the past (the estimated bounding box" and the "estimated feature vector" will be described later).

For example, a timing at which a detected bounding box and a detected feature vector for the nth frame are input to the evaluation unit 21 is defined as a timing Tn. At the timing Tn, a predicted bounding box and a predicted feature vector for the nth frame predicted by the predictor (not shown) based on an "estimated bounding box" or the like predicted for one or a plurality of frames at or before the (n−1)th frame are also input to the evaluation unit 21. That is, in this case, the predicted bounding box and the predicted feature vector are the bounding box and the feature vector for the nth frame predicted based on the past trajectory.

Then, based on the received first and second sets, the evaluation unit 21 generates a "prediction confidence vector" for each of the predicted bounding boxes, a "detection confidence vector" for each of the detected bounding boxes, and an "association weight matrix". The "association weight matrix" includes an "association weight" for each of the "pairs" of the predicted bounding boxes and the respective detected bounding boxes. The generated prediction confidence vectors, the detection confidence vectors, and the association weight matrix are output to the estimation unit 22.

The evaluation unit 21 includes, for example, a trained neural network (an evaluation model). The exemplary learning (i.e., training) of the neural network (the evaluation model) will be described in detail in a fourth example embodiment.

The estimation unit 22 receives the first and second sets, and the prediction confidence vectors, the detection confidence vectors, and the association weight matrix generated by the evaluation unit 21.

Then, the estimation unit 22 estimates a plurality of estimated bounding boxes, estimated confidence vectors of the respective estimated bounding boxes, estimated feature vectors of the respective estimated bounding boxes, and estimated object IDs corresponding to the respective estimated bounding boxes based on the plurality of prediction confidence vectors, the plurality of detection confidence vectors, and the association weight matrix generated by the evaluation unit 21, and the plurality of predicted bounding boxes, the plurality of detected bounding boxes, the plurality of predicted feature vectors, and the plurality of detected feature vectors. At least the estimated bounding box and the estimated object ID estimated for the nth frame are used for predictions for the (n+1)th and subsequent frames by the predictor (not shown). Note that the estimated feature vector estimated for the nth frame may also be used for the predictions for the (n+1)th and subsequent frames by the predictor (not shown). Further, the estimated confidence vector estimated for the nth frame may also be used for the predictions for the (n+1)th and subsequent frames by the predictor (not shown).

As described above, according to the second example embodiment, the estimation unit 22 of the visual object tracking apparatus 20 estimates a plurality of estimated bounding boxes and estimated object IDs respectively corresponding to the estimated bounding boxes based on a plurality of prediction confidence vectors, a plurality of detection confidence vectors, and an association weight matrix generated by the evaluation unit 21, and a plurality of predicted bounding boxes and a plurality of detected bounding boxes.

By the above-described configuration of the visual object tracking apparatus 20, estimated bounding boxes and estimated object IDs are estimated based on a plurality of prediction confidence vectors, a plurality of detection confidence vectors, and an association weight matrix generated by the evaluation unit 21 in addition to predicted bounding boxes and detected bounding boxes. Therefore, the tracking accuracy can be further improved.

Further, the evaluation unit 21 of the visual object tracking apparatus 20 generates a prediction confidence vector for each of the predicted bounding boxes, a detection confidence vector for each of the detected bounding boxes, and an association weight matrix based on the received first and second sets. The first set includes a plurality of predicted bounding boxes each having a corresponding object ID and a plurality of predicted feature vectors respectively corresponding to the plurality of predicted bounding boxes. The second set includes a plurality of detected bounding boxes and a plurality of detected feature vectors respectively corresponding to the plurality of detected bounding boxes.

By the above-described configuration of the visual object tracking apparatus 20, prediction confidence vectors, detection confidence vectors, and an association weight matrix are generated based on predicted feature vectors and detected feature vectors as well as the predicted bounding boxes and the detected bounding boxes. Therefore, the prediction confidence vectors, the detection confidence vectors, and the association weight matrix can be accurately generated. As a result, since the estimation accuracy of the estimation unit 22 is improved, the tracking accuracy can be further improved.

Third Example Embodiment

A third example embodiment relates to a more specific example embodiment.

Configuration Example of Visual Object Tracking Apparatus

Figure 3:
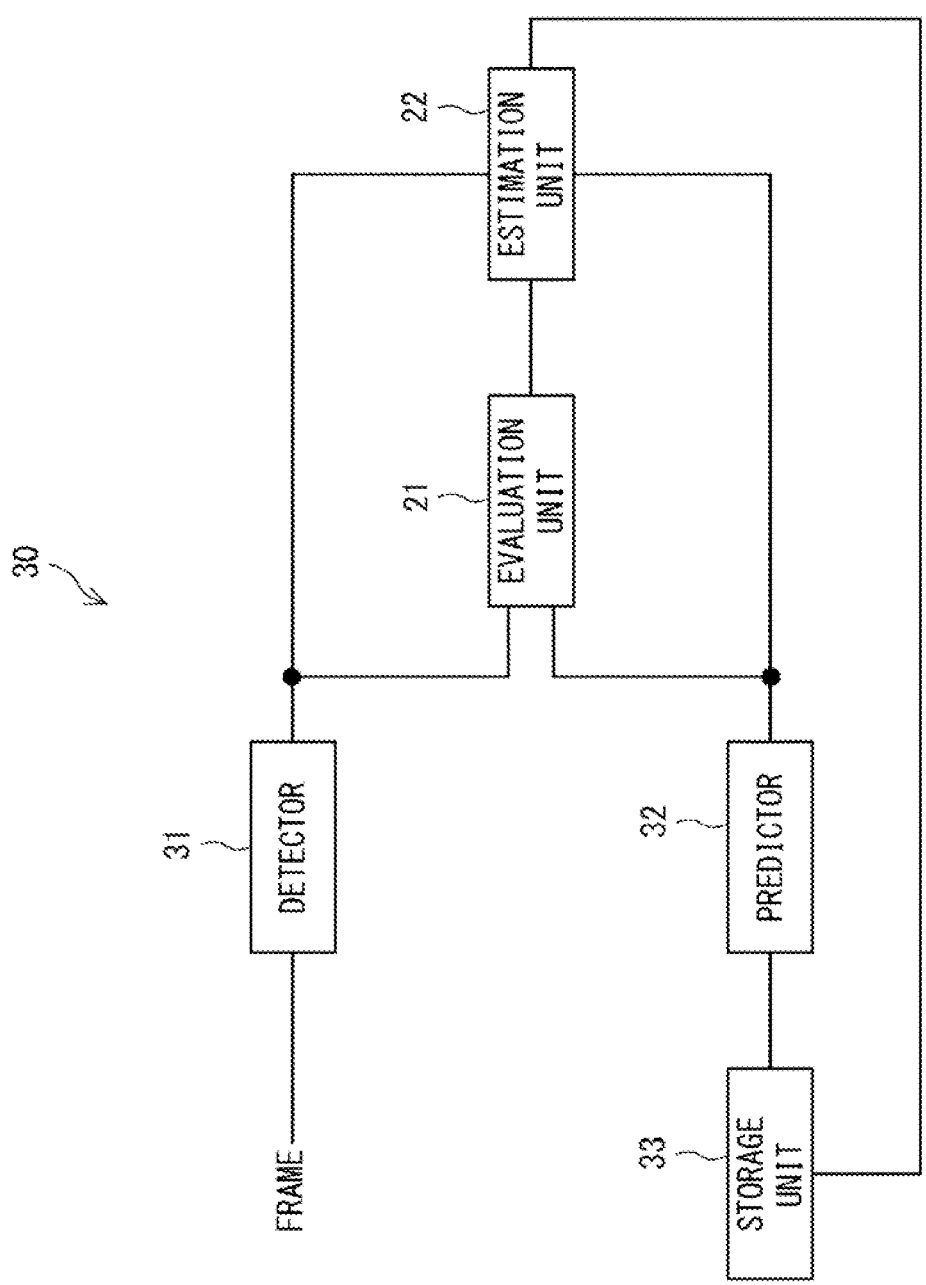
FIG. 3 is a block diagram showing an example of a visual object tracking apparatus according to a third example embodiment.

FIG. 3 is a block diagram showing an example of a visual object tracking apparatus according to the third example embodiment. In FIG. 3, a visual object tracking apparatus 30 includes an evaluation unit 21, an estimation unit 22, a detector 31, a predictor 32, and a storage unit 33.

A plurality of frames in a time series such as moving images are sequentially input to the detector 31. Then, the detector 31 detects each object image included in the input frame (hereinafter also referred to as the "current frame") and generates information about a bounding box corresponding to each detected object image (e.g., information about a location and a size of a bounding box in the current frame). The detector 31 outputs the generated information as the above-described "detected bounding box". Further, the detector 31 generates a feature vector based on an image in the detected bounding box and outputs the generated feature vector as the above-described "detected feature vector". That is, the detector 31 outputs the second set described above.

The storage unit 33 stores estimated bounding boxes, estimated confidence vectors, estimated feature vectors, and estimated object IDs estimated for past frames (i.e., frames before the current frame) by the estimation unit 22.

The predictor 33 acquires information about at least an estimated bounding box and an estimated object ID of one or a plurality of past frames from the storage unit 32 and predicts a bounding box and a feature vector corresponding to the bounding box for the current frame based on the acquired information. The predicted bounding box and the feature vector are the predicted bounding box and the predicted feature vector described above. Then, the predictor 32 outputs the predicted bounding box and the predicted feature vector (i.e., outputs the first set described above). Note that the predictor 32 may acquire, from the storage unit 33, information about an estimated feature vector, or information about an estimated feature vector and an estimated confidence vector together with the information about the estimated bounding box and the estimated object ID, and predict a bounding box and a feature vector corresponding to the bounding box for the current frame by using the acquired information.

Similarly to the second example embodiment, the evaluation unit 21 generates a prediction confidence vector for each of the predicted bounding boxes, a detection confidence vector for each of the detected bounding boxes, and an association weight matrix based on first and second sets received from the predictor 32 and the detector 31.

Similarly to the second example embodiment, the estimation unit 22 estimates a plurality of estimated bounding boxes, estimated confidence vectors of the respective estimated bounding boxes, estimated feature vectors of the respective estimated bounding boxes, and estimated object IDs corresponding to the respective estimated bounding boxes based on the plurality of prediction confidence vectors, the plurality of detection confidence vectors, and the association weight matrix generated by the evaluation unit 21, as well as the first and second sets.

Specifically, the estimation unit 22 in the third example embodiment determines, based on the association weights of the association weight matrix, a matching pair including a predicted bounding box and a detected bounding box matching each other, an unmatched predicted bounding box which does not match any detected bounding box, and an unmatched detected bounding box which does not match any predicted bounding box.

For example, the estimation unit 22 selects a group of pairs in such a manner that the sum total of the association weights is maximized. However, as a constraint condition, it is necessary to satisfy a condition that the same predicted bounding box should not be included in more than one pair and the same detected bounding box should not be included in more than one pair. Then, the estimation unit 22 defines, from the selected group of pairs, a pair whose association weight is equal to or larger than a "determination threshold" as the above-described matching pair. Further, the estimation unit 22 defines, from the selected group of pairs, a predicted bounding box and a detected bounding box included in a pair whose association weight is smaller than the "determination threshold" as the above-described unmatched predicted bounding box that does not match any detected bounding box and the unmatched detected bounding box which does not match any predicted bounding box, respectively. The above-described process corresponds to a "first processing operation example" described later.

Alternatively, for example, the estimation unit 22 may determine the matching pair including a predicted bounding box and a detected bounding box matching each other, the unmatched predicted bounding box which does not match any detected bounding box, and the unmatched detected bounding box which does not match any predicted bounding box in such a manner that the sum total of the association weights, the prediction confidence vectors, and the detection confidence vectors is maximized. However, as a constraint condition, it is necessary to satisfy a condition that a predicted bounding box included in the matching pair of a predicted bounding box and a detected bounding box matching each other never becomes the unmatched predicted bounding box which does not match any detected bounding box. Further, as a constraint condition, it is necessary to satisfy a condition that a detected bounding box included in the matching pair of a predicted bounding box and a detected bounding box matching each other never become the unmatched detected bounding box which does not match any predicted bounding box. The above-described process corresponds to a "second processing operation example" described later.

Then, for an unmatched predicted bounding box which does not match any detected bounding box and for which a value of the prediction confidence vector is larger than a "first threshold" (hereinafter referred to as a "first predicted bounding box"), the estimation unit 22 determines the first predicted bounding box, its prediction confidence vector, its predicted feature vector, and its object ID as an estimated bounding box, an estimated confidence vector, an estimated feature vector, and an estimated object ID, respectively.

Further, for a matching pair including a predicted bounding box and a detected bounding box matching each other, and including a "second predicted bounding box" and a "first detected bounding box", the estimation unit 22 determines the second predicted bounding box, its prediction confidence vector, its predicted feature vector, and its object ID as an estimated bounding box, an estimated confidence vector, an estimated feature vector, and an estimated object ID, respectively. Note that the value of the prediction confidence vector of the "second predicted bounding box" is larger than that of the detection confidence vector of the "first detected bounding box".

Further, for a matching pair including a predicted bounding box and a detected bounding box matching each other, and including a "third predicted bounding box" and a "second detected bounding box", the estimation unit 22 determines the second detected bounding box, its detection confidence vector, its detected feature vector, and an object ID of the third predicted bounding box as an estimated bounding box, an estimated confidence vector, an estimated feature vector, and an estimated object ID, respectively.

Note that the value of the prediction confidence vector of the "third predicted bounding box" is smaller than that of the detection confidence vector of the "second detected bounding box".

Further, for an unmatched detected bounding box which does not match any predicted bounding box and for which a value of the detection confidence vector is larger than a "second threshold" (hereinafter referred to as a "third predicted bounding box"), the estimation unit 22 determines the third detected bounding box, its detection confidence vector, its detected feature vector, and a new object ID as an estimated bounding box, an estimated confidence vector, an estimated feature vector, and an estimated object ID, respectively.

Example of Operation of Visual Object Tracking Apparatus

An example of processing operations performed by a visual object tracking apparatus having the above-described configuration will be described.

First Processing Operation Example

Figure 4:
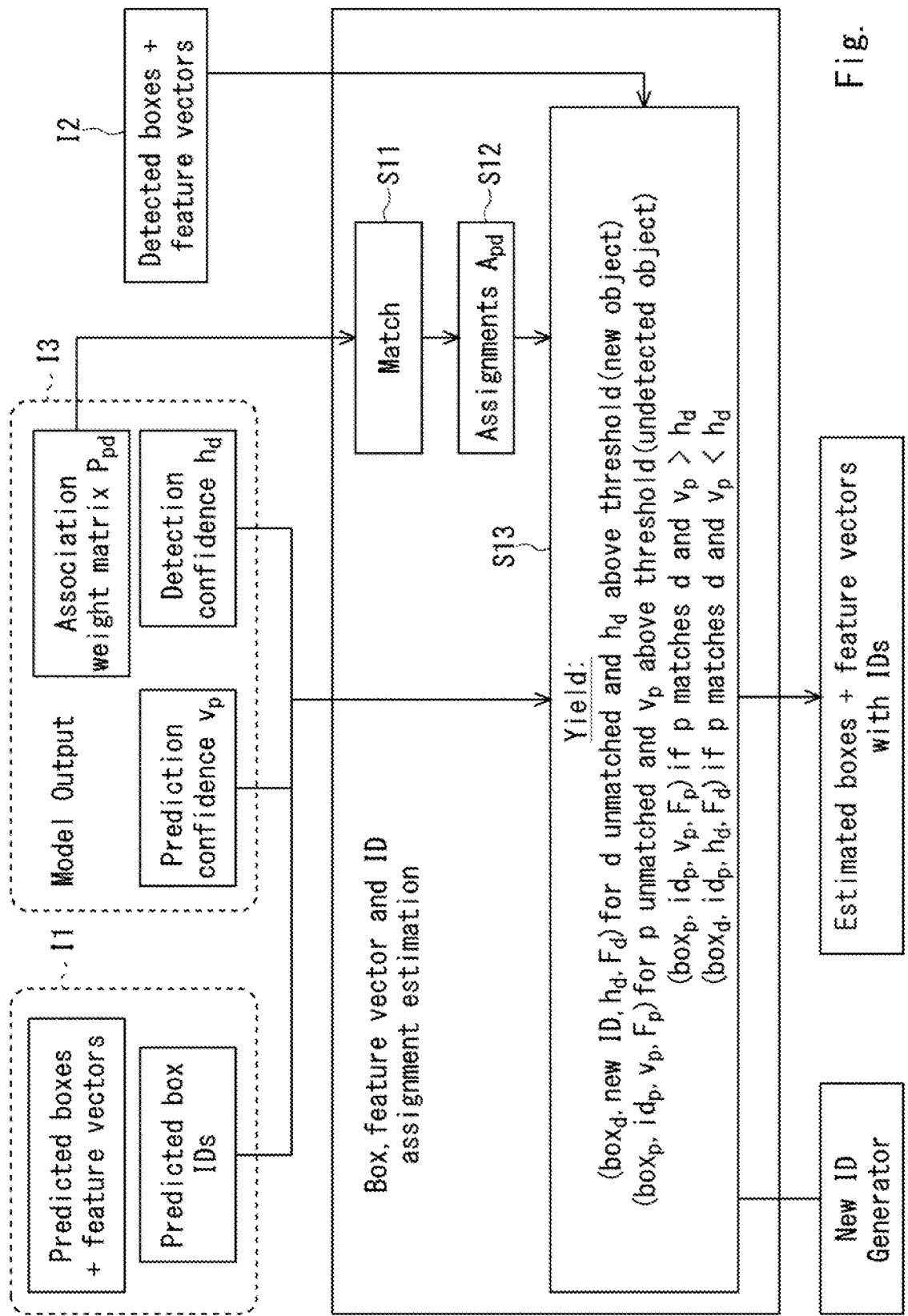
FIG. 4 is a diagram for explaining an example of processing operations performed by the visual object tracking apparatus according to the third example embodiment.

FIG. 4 is a diagram for explaining an example of processing operations performed by the visual object tracking apparatus according to the third example embodiment. Here, processing operations performed by the estimation unit 22, in particular, will be described.

In FIG. 4, information I1 corresponds to the first set described above. Further, information I2 corresponds to the second set described above. Further, information I3 corresponds to information output from the evaluation unit 21.

The estimation unit 22 determines, based on an association weight matrix Po, a matching pair including a predicted bounding box and a detected bounding box matching each other, an unmatched predicted bounding box which does not match any detected bounding box, and an unmatched detected bounding box which does not match any predicted bounding box (steps S11 and S12).

Specifically, the estimation unit 22 selects a group of pairs in which each of the pairs includes a predicted bounding box and a detected bounding box in such a manner that the sum total of the association weights is maximized. However, as a constraint condition, it is necessary to satisfy a condition that the same predicted bounding box should not be included in more than one pair and the same detected bounding box should not be included in more than one pair. For example, assume that there are three predicted bounding boxes PB1, PB2 and PB3, and three detected bounding boxes DB1, DB2 and DB3. In this case, there are nine pairs in total. Further, the association weights corresponding to the nine pairs are $P_{11}$, $P_{12}$, . . . , and $P_{33}$. Under the constraint condition that the same predicted bounding box should not be included in more than one pair and the same detected bounding box should not be included in more than one pair, a group of pairs in which each of the pairs includes a predicted bounding box and a detected bounding box is selected in such a manner that the sum total of the association weights is maximized. For example, when the sum total of the association weights $P_{11}$, $P_{23}$ and $P_{32}$ is the largest, a pair of the predicted bounding box PB1 and the detected bounding box DB1, a pair of the predicted bounding box PB2 and the detected bounding box DB3, and a pair of the predicted bounding box PB3 and the detected bounding box DB2 are selected.

Then, the estimation unit 22 defines, from the selected group of pairs, a pair whose association weight is equal to or larger than a "determination threshold" as the above-described matching pair. For example, when each of the association weights $P_{11}$ and $P_{23}$ is equal to or larger than the "determination threshold", the pair of the predicted bounding box PB1 and the detected bounding box DB1, and the pair of the predicted bounding box PB2 and the detected bounding box DB3 are the above-described matching pairs. Further, when the association weight $P_{32}$ is smaller than the determination threshold, the predicted bounding box PB3 is the above-described unmatched predicted bounding box which does not match any detected bounding box and the detected bounding box DB2 is the above-described unmatched detected bounding box which does not match any detected bounding box.

Next, the estimation unit 22 determines an estimated bounding box, an estimated confidence vector, an estimated feature vector, and an estimated object ID (step S13).

Specifically, for an unmatched detected bounding box which does not match any predicted bounding box and for which a value of the detection confidence vector is larger than a "predetermined threshold (the above-described second threshold)", the estimation unit 22 determines this detected bounding box, its detection confidence vector, its detected feature vector, and a new object ID as an estimated bounding box, an estimated confidence vector, an estimated feature vector, and an estimated object ID, respectively. For example, when the value of the detection confidence vector $h_2$ of the detected bounding box DB2 is larger than the predetermined threshold, the detected bounding box DB2, the detection confidence vector $h_2$, the detected feature vector of the detected bounding box DB2, and a new object ID become the estimated bounding box, the estimated confidence vector, the estimated feature vector, and the estimated object ID, respectively.

Further, for an unmatched predicted bounding box which does not match any detected bounding box and for which a value of the prediction confidence vector is larger than a "predetermined threshold (the above-described first threshold)", the estimation unit 22 determines this predicted bounding box, its prediction confidence vector, its predicted feature vector, and its object ID as an estimated bounding box, an estimated confidence vector, an estimated feature vector, and an estimated object ID, respectively. For example, when the value of the prediction confidence vector $v_3$ of the predicted bounding box PB3 is larger than the predetermined threshold, the predicted bounding box PB3, the prediction confidence vector $v_3$, the predicted feature vector of the predicted bounding box PB3, and the object ID of the predicted bounding box PB3 become the estimated bounding box, the estimated confidence vector, the estimated feature vector, and the estimated object ID, respectively.

Further, for a matching pair including a predicted bounding box and a detected bounding box matching each other, when the value of the prediction confidence vector of the predicted bounding box is larger than the value of the detection confidence vector of the detected bounding box, the estimation unit 22 determines the predicted bounding box, its prediction confidence vector, its predicted feature vector, and its object ID as the estimated bounding box, the estimated confidence vector, the estimated feature vector, and the estimated object ID, respectively. For example, for the above-described pair of the predicted bounding box PB1 and the detected bounding box DB1, when the value of the prediction confidence vector $v_1$ is larger than the value of the detection confidence vector $h_1$, the predicted bounding box PB1, the prediction confidence vector $v_1$, the predicted feature vector of the predicted bounding box PB1, and the object ID of the predicted bounding box PB1 become the estimated bounding box, the estimated confidence vector, the estimated feature vector, and the estimated object ID, respectively.

Further, for a matching pair including a predicted bounding box and a detected bounding box matching each other, when the value of the prediction confidence vector of the predicted bounding box is smaller than the value of the detection confidence vector of the detected bounding box, the estimation unit 22 determines the detected bounding box, its detection confidence vector, its detected feature vector, and the object ID of the predicted bounding box as the estimated bounding box, the estimated confidence vector, the estimated feature vector, and the estimated object ID, respectively. For example, for the above-described pair of the predicted bounding box PB2 and the detected bounding box DB3, when the value of the prediction confidence vector $v_2$ is larger than the value of the detection confidence vector $h_3$, the detected bounding box DB3, the detection confidence vector $h_3$, the detected feature vector of the detected bounding box DB3, and the object ID of the predicted bounding box PB2 become the estimated bounding box, the estimated confidence vector, the estimated feature vector, and the estimated object ID, respectively.

Second Processing Operation Example

Figure 5:
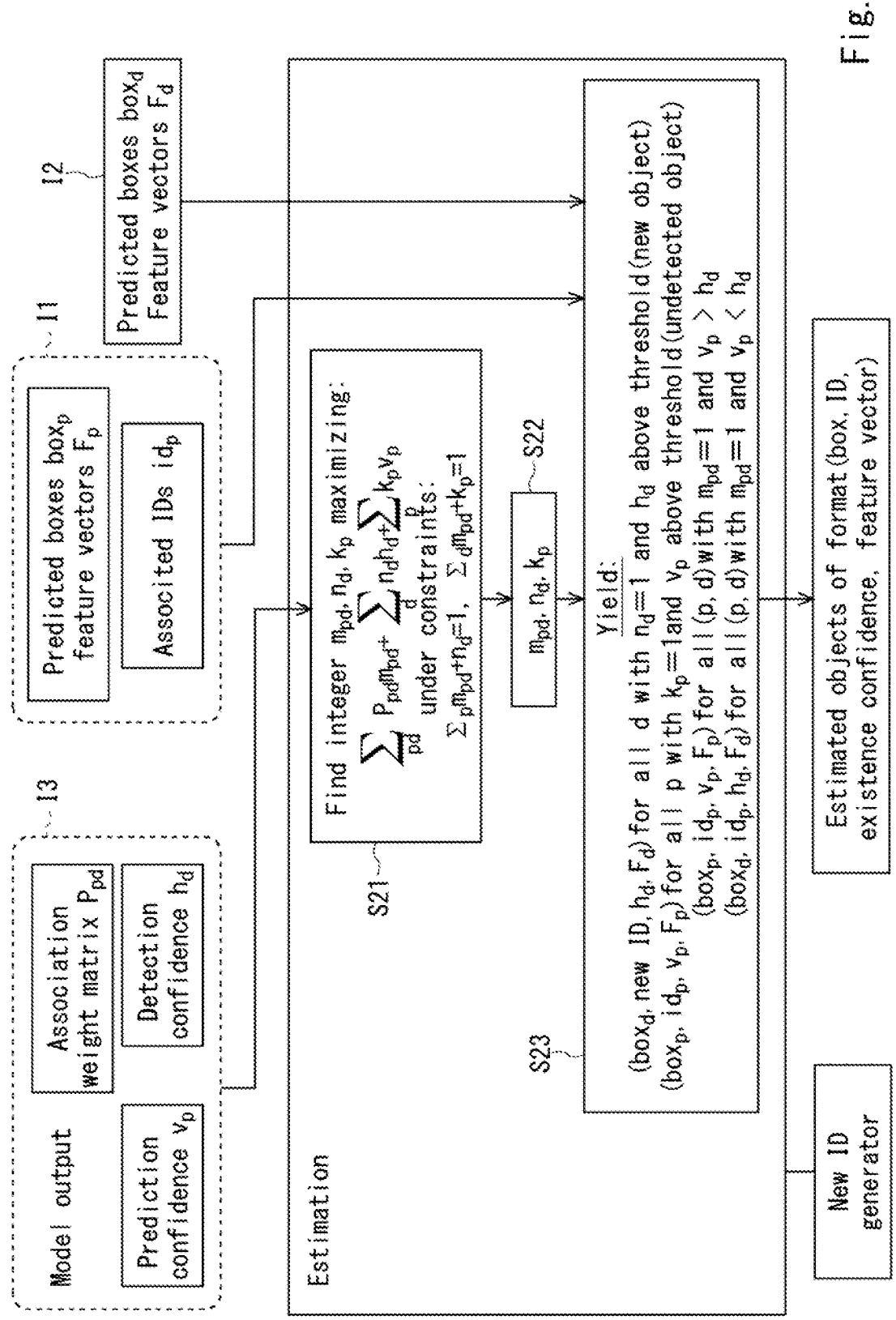
FIG. 5 is a diagram for explaining an example of processing operations performed by the visual object tracking apparatus according to the third example embodiment.

FIG. 5 is a diagram for explaining an example of processing operations performed by the visual object tracking apparatus according to the third example embodiment. Here, processing operations performed by the estimation unit 22, in particular, will be described.

In FIG. 5, information I1 corresponds to the first set described above. Further, information I2 corresponds to the second set described above. Further, information I3 corresponds to information output from the evaluation unit 21.

The estimation unit 22 determines a matching pair including a predicted bounding box and a detected bounding box matching each other, an unmatched predicted bounding box which does not match any detected bounding box, and an unmatched detected bounding box which does not match any predicted bounding box in such a manner that the sum total of the association weights, the prediction confidence vectors, and the detection confidence vectors is maximized (steps S21 and S22). However, as a constraint condition, it is necessary to satisfy a condition that a predicted bounding box included in the matching pair of a predicted bounding box and a detected bounding box matching each other never becomes the unmatched predicted bounding box which does not match any detected bounding box. Further, as a constraint condition, it is necessary to satisfy a condition that a detected bounding box included in the matching pair of a predicted bounding box and a detected bounding box matching each other never become the unmatched detected bounding box which does not match any predicted bounding box.

For example, when the sum total of the association weights $P_{11}$, the association weight $P_{23}$, the prediction confidence vector $v_3$, and the detection confidence vector $h_2$ is the largest, each of a pair of the predicted bounding box PB1 and the detected bounding box DB1 and a pair of the predicted bounding box PB2 and the detected bounding box DB3 is the above-described matching pair. The predicted bounding box PB3 is the above-described predicted bounding box that does not match any detected bounding box, and the detected bounding box DB2 is the above-described detected bounding box that does not match any predicted bounding box.

Further, similarly to the above-described step S13, the estimation unit 22 determines an estimated bounding box, an estimated confidence vector, an estimated feature vector, and an estimated object ID (step S23).

Modified Example

The detector 31 may generate existence confidence of the "detected bounding box" (hereinafter referred as "existence confidence $c_d$") in addition to the "detected bounding box" and the "detected feature vector". Further, the predictor 32 may generate existence confidence of the "predicted bounding box" (hereinafter referred to as "existence confidence $c_p$") in addition to the "predicted bounding box" and the "predicted feature vector". Further, the evaluation unit 21 may generate a prediction confidence vector for each predicted bounding box, a detection confidence vector for each detected bounding box, and an association weight matrix based on the "detected bounding box", the "detected feature vector", the existence confidence $c_d$ of the "detected bounding box", the "predicted bounding box", the "predicted feature vector", and the existence confidence $c_p$ of the "predicted bounding box" received from the predictor 32 and the detector 31. In this way, the evaluation unit 21 generates the prediction confidence vectors, the detection confidence vectors, and the association weight matrix based on the existence confidence $c_d$ of the "detected bounding boxes" and the existence confidence $c_p$ of the "predicted bounding boxes" as well as the other factors. Therefore, it is possible to accurately generate the prediction confidence vectors, the detection confidence vectors, and the association weight matrix. As a result, since the estimation accuracy of the estimation unit 22 is improved, the tracking accuracy can be further improved.

Fourth Example Embodiment

A fourth example embodiment relates to a machine learning apparatus (a machine learning system) that controls the above-described learning of the neural network (the evaluation model).

Configuration Example of Machine Learning Apparatus

Figure 6:
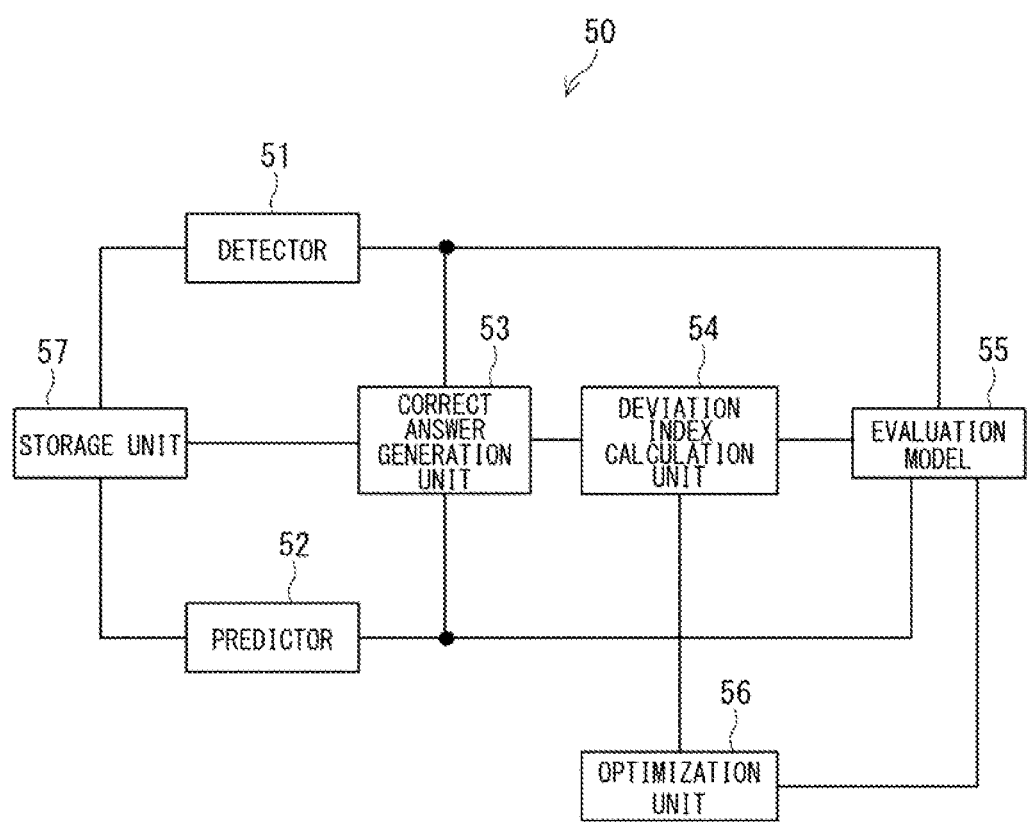
FIG. 6 is a block diagram showing an example of a machine learning apparatus (a machine learning system) according to a fourth example embodiment.

FIG. 6 is a block diagram showing an example of a machine learning apparatus (a machine learning system) according to the fourth example embodiment. In FIG. 6, a machine learning apparatus 50 includes a detector 51, a predictor 52, a correct answer generation unit 53, a deviation index calculation unit 54, an evaluation model 55, an optimization unit 56, and a storage unit 57.

The storage unit 57 stores a "group of teacher images" and a plurality of "correct bounding boxes" respectively corresponding to the group of teacher images. Further, an object ID is assigned to each of the correct bounding boxes. The "group of teacher images" is, for example, a plurality of frames in time series such as moving images. Further, the "correct bounding box" is, for example, a bounding box that is manually defined so as to surround an object image included in each of the teacher images or it is, for example, a bounding box that is automatically assigned in advance by an object detector (not shown) that is superior in accuracy than detector 51 but requires more computation than practical in real-time usage during inference time. Further, for example, a corresponding object ID is manually assigned to the "correct bounding box".

Each teacher image in the group of teacher images is sequentially input to the detector 51. Then, the detector 51 detects each object image included in the input teacher image (hereinafter also referred to as the "current teacher image" or the "current frame") and generates information about a bounding box corresponding to each detected object image (e.g., information about the location and the size of a bounding box in the current teacher image). The detector 51 outputs the generated information as a "detected bounding box". Further, the detector 51 generates a feature vector based on the image in the detected bounding box and outputs the generated feature vector as a "detected feature vector".

The predictor 52 acquires information about at least an estimated bounding box and an estimated object ID of one or a plurality of "past teacher images" from the storage unit 57, and predicts a bounding box of the current teacher image and a feature vector corresponding to that bounding box based on the acquired information. The "past teacher image" is an image that was taken at a timing before the timing at which the "current teacher image" is taken. Then, the predictor 52 outputs the predicted bounding box and the predicted feature vector as a "predicted bounding box" and a "predicted feature vector", respectively.

The correct answer generation unit 53 receives a plurality of detected bounding boxes and a plurality of detected feature vectors for the current teacher image from the detector 51. Further, the correct answer generation unit 53 receives a plurality of predicted bounding boxes and a plurality of predicted feature vectors for the current teacher image from the predictor 52. Further, the correct answer generation unit 53 also receives a plurality of correct bounding boxes (with object IDs assigned thereto) corresponding to the current teacher image. Then, the correct answer generation unit 53 specifies a pair of a predicted bounding box and a detected bounding box both of which match the same correct bounding box, a predicted bounding box matching a correct bounding box which does not match any detected bounding box, and a detected bounding box matching a correct bounding box which does not match any predicted bounding box. Then, the correct answer generation unit 53 generates a group of a "correct association weight matrix", a "correct prediction confidence vector", and a "correct detection confidence vector" based on the specified pair, the specified predicted bounding box, and the specified detected bounding box.

The evaluation model 55 corresponds to the evaluation model of the evaluation unit 21 described in the second and third example embodiments. That is, the evaluation model 55 is a model that generates a prediction confidence vector for each predicted bounding box, a detection confidence vector for each detected bounding box, and an association weight matrix based on the above-described "first set" and the "second set". Note that the "first set" includes a plurality of predicted bounding boxes and a plurality of predicted feature vectors for the current teacher image received from the predictor 52. Further, the "second set" includes a plurality of detected bounding boxes and a plurality of detected feature vectors for the current teacher image received from the detector 51. Further, the evaluation model 55 outputs the group of the prediction confidence vectors, the detection confidence vectors, and the association weight matrix generated based on the "first set" and the "second set" to the deviation index calculation unit 54.

The deviation index calculation unit 54 calculates a "deviation index" indicating a "deviation level (a deviation value)" between the above-described group generated by the correct answer generation unit 53 and the above-described group output from the evaluation model 55. Note that, for example, it is meant that the closer the "deviation level (the deviation value)" indicated by the calculated "deviation index" is to zero, the closer the group generated by the evaluation model 55 is to the correct group generated by the correct answer generation unit 53. Therefore, it means that the learning of the evaluation model 55 has advanced. Accordingly, the learning of the evaluation model 55 is carried out until it reaches a certain learning progress level at which the "deviation level (the deviation value)" becomes smaller than a predetermined level. Note that the deviation index calculation unit 54 may use a Loss Function to calculate the "deviation index".

The optimization unit 56 adjusts parameters (such as weights in the neural network) of the evaluation model 55 based on the "deviation index" calculated by the deviation index calculation unit 54. That is, the optimization unit 56 adjusts the parameters of the evaluation model 55 so that the "deviation index" calculated by the deviation index calculation unit 54 decreases.

Example of Operation of Machine Learning Apparatus

Figure 7:
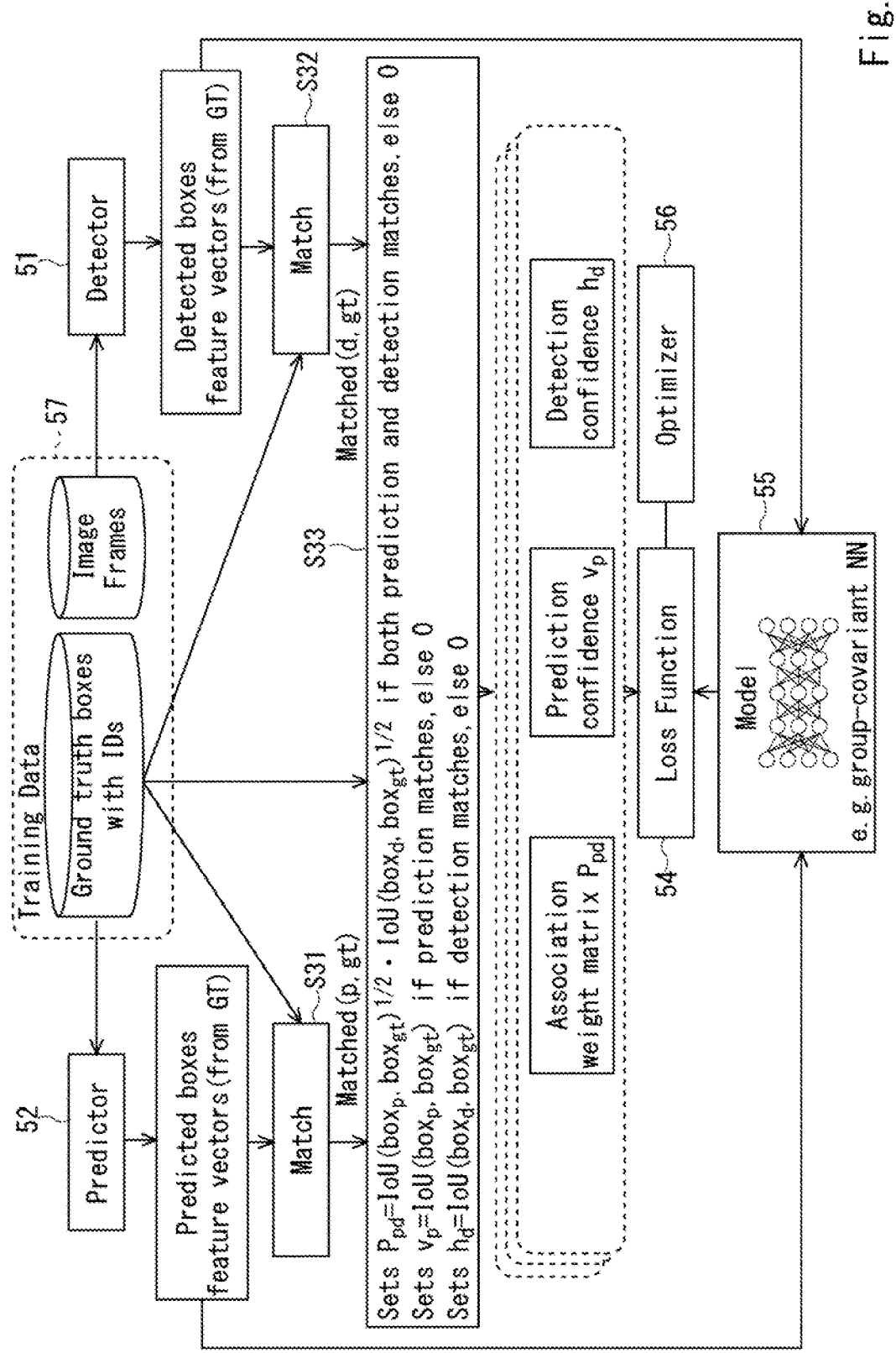
FIG. 7 is a diagram for explaining an example of processing operations performed by the machine learning apparatus according to the fourth example embodiment.

An example of processing operations performed by the machine learning apparatus having the above-described configuration will be described. FIG. 7 is a diagram for explaining an example of processing operations performed by the machine learning apparatus according to the fourth example embodiment. Here, processing operations performed by the correct answer generation unit 53, in particular, will be described.

The correct answer generation unit 53 specifies "a pair of a predicted bounding box and a detected bounding box both of which match the same correct bounding box", "a predicted bounding box matching a correct bounding box which does not match any detected bounding box, and "a detected bounding box matching a correct bounding box which does not match any predicted bounding box" (steps S31 and S32).

For example, the correct answer generation unit 53 selects one of a plurality of correct bounding boxes (with object IDs assigned thereto) corresponding to the current teacher image one after another as a "correct bounding box to be processed". Then, the correct answer generation unit 53 specifies a predicted bounding box corresponding to the "correct bounding box to be processed" (step S31). Further, the correct answer generation unit 53 specifies a detected bounding box corresponding to the "correct bounding box to be processed" (step S32). When the predicted bounding box and the detected bounding box corresponding to the "correct bounding box to be processed" are specified in the steps S31 and S32, the specified predicted bounding box and the detected bounding box become the above-described "pair of a predicted bounding box and a detected bounding box both of which match the same correct bounding box. Further, when the predicted bounding box corresponding to the "correct bounding box to be processed" is specified in the step S31, but the detected bounding box corresponding to the "correct bounding box to be processed" is not specified (i.e., does not exist) in the step S32, this predicted bounding box becomes the above-described "predicted bounding box matching a correct bounding box which does not match any detected bounding box". Further, when the detected bounding box corresponding to the "correct bounding box to be processed" is specified in the step S32, but the predicted bounding box corresponding to the "correct bounding box to be processed" is not specified (i.e., does not exist) in the step S31, this detected bounding box becomes the above-described "detected bounding box matching a correct bounding box which does not match any predicted bounding box".

Then, the correct answer generation unit 53 generates (calculates) "a correct association weight matrix", "correct prediction confidence vectors", and "correct detection confidence vectors" based on the specified pair, the specified predicted bounding box, and the specified detected bounding box (step S33).

For example, the correct answer generation unit 53 calculates a product of a square root of IoU of the predicted bounding box and the correct bounding box and a square root of IoU of the detected bounding box and the correct bounding box as an association weight $P_{pd}$ of the "pair of a predicted bounding box and a detected bounding box both of which match the same correct bounding box". Further, the correct answer generation unit 53 calculates IoU of the predicted bounding box and the correct bounding box as a value of a prediction confidence vector $v_p$ of the "predicted bounding box matching a correct bounding box which does not match any detected bounding box". Further, the correct answer generation unit 53 calculates IoU of the detected bounding box and the correct bounding box as a value of a detection confidence vector ha of the "detected bounding box matching a correct bounding box which does not match any predicted bounding box".

Then, as described above, the deviation index calculation unit 54 calculates a "deviation index" based on the "correct association weight matrix", the "correct prediction confidence vectors", and the "correct detection confidence vectors" generated by the correct answer generation unit 53. Then, the optimization unit 56 adjusts the parameters of the evaluation model 55 based on the "deviation index" calculated by the deviation index calculation unit 54. In this way, the machine learning apparatus 50 can train the evaluation model 55.

Other Example Embodiments

<1> Although the second to fourth example embodiments have been described on the assumption that the visual object tracking apparatus (the visual object tracking system) and the machine learning apparatus (the machine learning system) are different devices (different systems), the invention is not limited to such configurations. That is, they may be included in the same device (the same system). In such a case, only one function unit may be provided for a plurality of functions units that have the same function, i.e., for the detectors 31 and 51, for the predictors 32 and 52, for the evaluation unit 21 and the evaluation model 55, and for the storage units 33 and 57.

Figure 8:
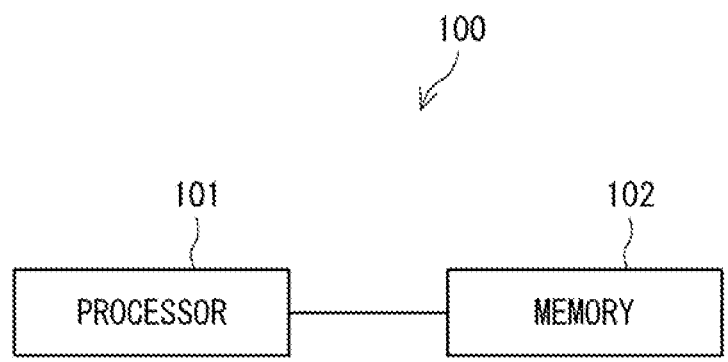
FIG. 8 shows an example of a hardware configuration of a visual object tracking apparatus (a visual object tracking system).

<2> FIG. 8 shows an example of a hardware configuration of a visual object tracking apparatus (a visual object tracking system). In FIG. 8, a visual object tracking apparatus (a visual object tracking system) 100 includes a processor 101 and a memory 102. The processor 101 may be, for example, a microprocessor, an MPU (Micro Processing Unit), or a CPU (Central Processing Unit). The processor 101 may include a plurality of processors. The memory 102 is formed by a combination of a volatile memory and a nonvolatile memory. The memory 102 may include a storage located remotely from the processor 101. In this case, the processor 101 may access the memory 102 through an I/O interface (not shown).

Each of the visual object tracking apparatuses (the visual object tracking system) 10, 20 and 30 according to the first to third example embodiments may have the hardware configuration shown in FIG. 8. The estimation units 11 and 22, the evaluation unit 21, the detector 31, and the predictor 32 of the visual object tracking apparatuses (the visual object tracking system) 10, 20 and 30 according to the first to third example embodiments may be implemented by having the processor 101 load and execute a program(s) stored in the memory 102. The storage unit 33 may be implemented by the memory 102. The program may be stored in various types of non-transitory computer readable media and thereby supplied to the visual object tracking apparatuses (the visual object tracking system) 10, 20 and 30. The non-transitory computer readable media includes various types of tangible storage media. Examples of the non-transitory computer readable media include a magnetic recording medium (such as a flexible disk, a magnetic tape, and a hard disk drive) and a magneto-optic recording medium (such as a magneto-optic disk). Further, examples of the non-transitory computer readable media include CD-ROM (Read Only Memory), CD-R, and CD-R/W. Further, examples of the non-transitory computer readable media include a semiconductor memory. The semiconductor memory includes, for example, a mask ROM, a PROM (Programmable ROM), an EPROM (Erasable PROM), a flash ROM, and a RAM (Random Access Memory). These programs may be supplied to the visual object tracking apparatuses (the visual object tracking system) 10, 20 and 30 by using various types of transitory computer readable media. Examples of the transitory computer readable media include an electrical signal, an optical signal, and an electromagnetic wave. The transitory computer readable media can be used to supply programs to the visual object tracking apparatuses (the visual object tracking system) 10, 20 and 30 through a wired communication line (e.g., electric wires and optical fibers) or a wireless communication line.

Figure 9:
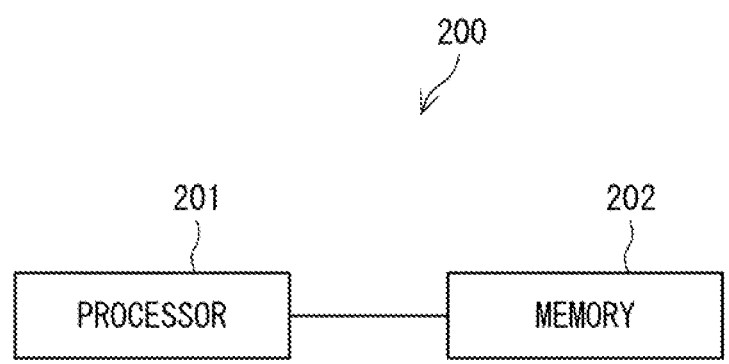
FIG. 9 shows an example of a hardware configuration of a machine learning apparatus (a machine learning system).

<3> FIG. 9 shows an example of a hardware configuration of a machine learning apparatus (a machine learning system). In FIG. 9, a machine learning apparatus (a machine learning system) 200 includes a processor 201 and a memory 202. The processor 201 may be, for example, a microprocessor, an MPU (Micro Processing Unit), or a CPU (Central Processing Unit). The processor 201 may include a plurality of processors. The memory 202 is formed by a combination of a volatile memory and a nonvolatile memory. The memory 202 may include a storage located remotely from the processor 201. In this case, the processor 201 may access the memory 202 through an I/O interface (not shown).

The machine learning apparatus (the machine learning system) 50 according to the fourth example embodiment may have the hardware configuration shown in FIG. 9. The detector 51, the predictor 52, the correct answer generation unit 53, the deviation index calculation unit 54, the evaluation model 55, and the optimization unit 56 of the machine learning apparatus (the machine learning system) 50 according to the fourth example embodiment may be implemented by having the processor 201 load and execute a program(s) stored in the memory 202. The storage unit 57 may be implemented by the memory 202. The program may be stored in various types of non-transitory computer readable media and thereby supplied to the machine learning apparatus (the machine learning system) 50. The non-transitory computer readable media includes various types of tangible storage media. Examples of the non-transitory computer readable media include a magnetic recording medium (such as a flexible disk, a magnetic tape, and a hard disk drive) and a magneto-optic recording medium (such as a magneto-optic disk). Further, examples of the non-transitory computer readable media include CD-ROM (Read Only Memory), CD-R, and CD-R/W. Further, examples of the non-transitory computer readable media include a semiconductor memory. The semiconductor memory includes, for example, a mask ROM, a PROM (Programmable ROM), an EPROM (Erasable PROM), a flash ROM, and a RAM (Random Access Memory). These programs may be supplied to the machine learning apparatus (the machine learning system) 50 by using various types of transitory computer readable media. Examples of the transitory computer readable media include an electrical signal, an optical signal, and an electromagnetic wave. The transitory computer readable media can be used to supply programs to the machine learning apparatus (the machine learning system) 50 through a wired communication line (e.g., electric wires and optical fibers) or a wireless communication line.

Figure 10:
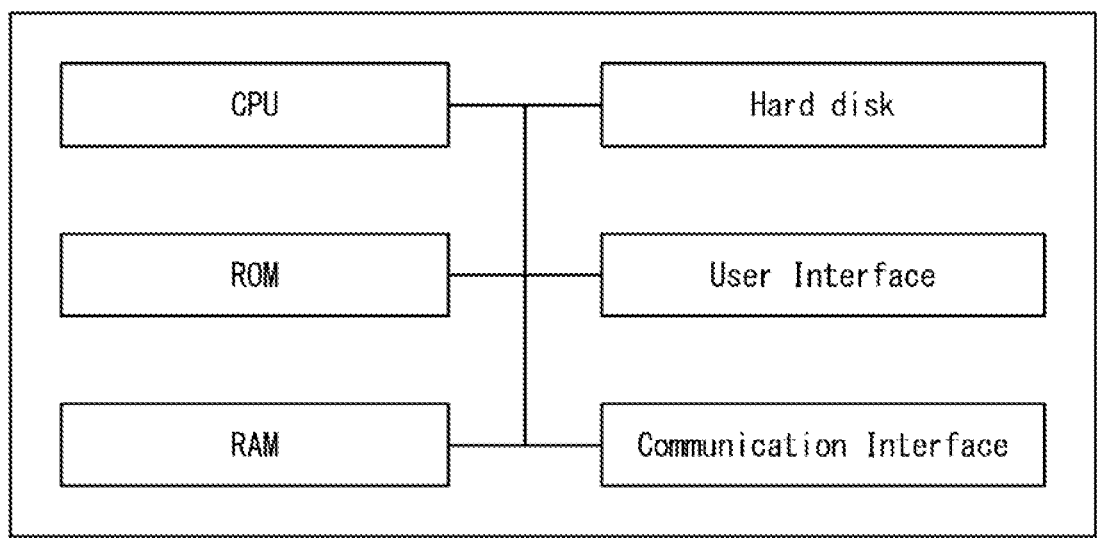
FIG. 10 shows a specific example of a hardware configuration.

That is, each of the visual object tracking apparatuses (the visual object tracking systems) 10, 20 and 30 according to the first to third example embodiments, and the machine learning apparatus (the machine learning system) according to the fourth example embodiment may have a hardware configuration shown in FIG. 10 as its specific hardware configuration. FIG. 10 shows a specific example of the hardware configuration.

Although the present disclosure is explained above with reference to example embodiments, the present disclosure is not limited to the above-described example embodiments. Various modifications that can be understood by those skilled in the art can be made to the configuration and details of the present disclosure within the scope of the invention.

For example, the whole or part of the example embodiments disclosed above can be described as, but not limited to, the following supplementary notes.

(Supplementary Note 1)

A visual object tracking method comprising estimating a plurality of estimated bounding boxes and estimated object IDs respectively corresponding to the estimated bounding boxes based on a plurality of predicted bounding boxes each having a corresponding object ID, and a plurality of detected bounding boxes.

(Supplementary Note 2)

The visual object tracking method described in Supplementary note 1, further comprising:
 receiving a first set including the plurality of predicted bounding boxes and a plurality of predicted feature vectors respectively corresponding to the plurality of predicted bounding boxes, and a second set including the plurality of detected bounding boxes and the plurality of detected feature vectors respectively corresponding to the plurality of detected bounding boxes; and
 generating, based on the first set and the second set, a prediction confidence vector for each of the predicted bounding boxes, a detection confidence vector for each of the detected bounding boxes, and an association weight matrix, the association weight matrix including association weights respectively corresponding to pairs of predicted bounding boxes and detected bounding boxes, wherein
 the estimating comprises estimating the plurality of estimated bounding boxes, estimated confidence vectors respectively corresponding to the estimated bounding boxes, estimated feature vectors respectively corresponding to the estimated bounding boxes, and estimated object IDs respectively corresponding to the estimated bounding boxes based on the plurality of prediction confidence vectors, the plurality of detection confidence vectors, the association weight matrix, the first set, and the second set.

(Supplementary Note 3)

The visual object tracking method described in Supplementary note 2, wherein
 the estimating comprises:
   determining a matching pair including a predicted bounding box and a detected bounding box matching each other, an unmatched predicted bounding box which does not match any detected bounding box, and an unmatched detected bounding box which does not match any predicted bounding box; and
   determining, for a first predicted bounding box which does not match any detected bounding box and whose prediction confidence vector is larger than a first threshold, the first predicted bounding box, its prediction confidence vector, its predicted feature vector, and its object ID as the estimated bounding box, the estimated confidence vector, the estimated feature vector, and the estimated object ID, respectively.

(Supplementary Note 4)

The visual object tracking method described in Supplementary note 3, wherein the estimating comprises determining, for a matching pair including a second predicted bounding box and a first detected bounding box in which a prediction confidence vector of the second predicted bounding box is larger than a detection confidence vector of the first detected bounding box, the second predicted bounding box, its prediction confidence vector, its predicted feature vector, and its object ID as the estimated bounding box, the estimated confidence vector, the estimated feature vector, and the estimated object ID, respectively.

(Supplementary Note 5)

The visual object tracking method described in Supplementary note 3 or 4, wherein the estimating comprises determining, for a matching pair including a third predicted bounding box and a second detected bounding box in which a prediction confidence vector of the third predicted bounding box is smaller than a detection confidence vector of the second detected bounding box, the second detected bounding box, its detection confidence vector, its predicted feature vector, and an object ID of the third predicted bounding box as the estimated bounding box, the estimated confidence vector, the estimated feature vector, and the estimated object ID, respectively.

(Supplementary Note 6)

The visual object tracking method described in any one of Supplementary notes 3 to 5, the estimating comprises determining, for a third detected bounding box which does not match any predicted bounding box and whose detection confidence vector is larger than a second threshold, the third detected bounding box, its detection confidence vector, its detected feature vector, and a new object ID as the estimated bounding box, the estimated confidence vector, the estimated feature vector, and the estimated object ID, respectively.

(Supplementary Note 7)

A visual object tracking system comprising estimation means configured to estimate a plurality of estimated bounding boxes and estimated object IDs respectively corresponding to the estimated bounding boxes based on a plurality of predicted bounding boxes each having a corresponding object ID, and a plurality of detected bounding boxes.

(Supplementary Note 8)

The visual object tracking system described in Supplementary note 7, further comprising evaluation means configured to receive a first set including the plurality of predicted bounding boxes and a plurality of predicted feature vectors respectively corresponding to the plurality of predicted bounding boxes, and a second set including the plurality of detected bounding boxes and the plurality of detected feature vectors respectively corresponding to the plurality of detected bounding boxes, and generate a prediction confidence vector for each of the predicted bounding boxes, a detection confidence vector for each of the detected bounding boxes, and an association weight matrix, the association weight matrix including association weights respectively corresponding to pairs of predicted bounding boxes and detected bounding boxes, wherein the estimation means estimates the plurality of estimated bounding boxes, estimated confidence vectors respectively corresponding to the estimated bounding boxes, estimated feature vectors respectively corresponding to the estimated bounding boxes, and estimated object IDs respectively corresponding to the estimated bounding boxes based on the plurality of prediction confidence vectors, the plurality of detection confidence vectors, and the association weight matrix generated by the evaluation means, as well as the first set and the second set.

(Supplementary Note 9)

The visual object tracking system described in Supplementary note 8, wherein the estimation means determines a matching pair including a predicted bounding box and a detected bounding box matching each other, an unmatched predicted bounding box which does not match any detected bounding box, and an unmatched detected bounding box which does not match any predicted bounding box; and the estimation means determines, for a first predicted bounding box which does not match any detected bounding box and whose prediction confidence vector is larger than a first threshold, the first predicted bounding box, its prediction confidence vector, its predicted feature vector, and its object ID as the estimated bounding box, the estimated confidence vector, the estimated feature vector, and the estimated object ID, respectively.

(Supplementary Note 10)

The visual object tracking system described in Supplementary note 9, wherein the estimation means determines, for a matching pair including a second predicted bounding box and a first detected bounding box in which a prediction confidence vector of the second predicted bounding box is larger than a detection confidence vector of the first detected bounding box, the second predicted bounding box, its prediction confidence vector, its predicted feature vector, and its object ID as the estimated bounding box, the estimated confidence vector, the estimated feature vector, and the estimated object ID, respectively.

(Supplementary Note 11)

The visual object tracking system described in Supplementary note 9 or 10, wherein the estimation means determines, for a matching pair including a third predicted bounding box and a second detected bounding box in which a prediction confidence vector of the third predicted bounding box is smaller than a detection confidence vector of the second detected bounding box, the second detected bounding box, its detection confidence vector, its predicted feature vector, and an object ID of the third predicted bounding box as the estimated bounding box, the estimated confidence vector, the estimated feature vector, and the estimated object ID, respectively.

(Supplementary Note 12)

The visual object tracking system described in any one of Supplementary notes 9 to 11, the estimation means determines, for a third detected bounding box which does not match any predicted bounding box and whose detection confidence vector is larger than a second threshold, the third detected bounding box, its detection confidence vector, its detected feature vector, and a new object ID as the estimated bounding box, the estimated confidence vector, the estimated feature vector, and the estimated object ID, respectively.

(Supplementary Note 13)

A machine learning method for training an evaluation model for predicted bounding boxes and detected bounding boxes, wherein the evaluation model receives a first set including a plurality of predicted bounding boxes each having a corresponding object ID and a plurality of predicted feature vectors respectively corresponding to the plurality of predicted bounding boxes, and a second set including a plurality of detected bounding boxes and a plurality of detected feature vectors respectively corresponding to the plurality of detected bounding boxes, and generates a prediction confidence vector for each of the predicted bounding boxes, a detection confidence vector for each of the detected bounding boxes, and an association weight matrix, the association weight matrix including association weights respectively corresponding to pairs of predicted bounding boxes and detected bounding boxes, and wherein the machine learning method comprises:

obtaining the second set obtained based on a group of teacher images and the first set obtained based on a plurality of correct bounding boxes corresponding to the group of teacher images;

specifying, based on the first set and the second set, a pair of a predicted bounding box and a detected bounding box both of which match the same correct bounding box, a predicted bounding box matching a correct bounding box which does not match any detected bounding box, and a detected bounding box matching a correct bounding box which does not match any predicted bounding box;

generating a correct association weight matrix, a correct prediction confidence vector, and a correct detection confidence vector based on the specified pair, the specified predicted bounding box, and the specified detected bounding box;

calculating a deviation index indicating a deviation level between a group of the prediction confidence vector, the detection confidence vector, and the association weight matrix output from the evaluation model based on the first set and the second set, and a group of the correct prediction confidence vector, the correct detection confidence vector, and the correct association weight matrix; and adjusting a parameter of the evaluation model based on the deviation index.

(Supplementary Note 14)

A machine learning system configured to train an evaluation model for predicted bounding boxes and detected bounding boxes, wherein the evaluation model receives a first set including a plurality of predicted bounding boxes each having a corresponding object ID and a plurality of predicted feature vectors respectively corresponding to the plurality of predicted bounding boxes, and a second set including a plurality of detected bounding boxes and a plurality of detected feature vectors respectively corresponding to the plurality of detected bounding boxes, and generates a prediction confidence vector for each of the predicted bounding boxes, a detection confidence vector for each of the detected bounding boxes, and an association weight matrix, the association weight matrix including association weights respectively corresponding to pairs of predicted bounding boxes and detected bounding boxes, and wherein the machine learning system comprises: prediction means; detection means; correct answer generation means; deviation index calculation means; and optimization means, wherein the detection means outputs, to the evaluation model and the correct answer generation means, the second set obtained based on a group of teacher images, the prediction means outputs, to the evaluation model and the correct answer generation means, the first set obtained based on a plurality of correct bounding boxes corresponding to the group of teacher images, the correct answer generation means specifies a pair of a predicted bounding box and a detected bounding box both of which match the same correct bounding box, a predicted bounding box matching a correct bounding box which does not match any detected bounding box, and a detected bounding box matching a correct bounding box which does not match any predicted bounding box, and generates a correct association weight matrix, a correct prediction confidence vector, and a correct detection confidence vector based on the specified pair, the specified predicted bounding box, and the specified detected bounding box, the deviation index calculation means calculates a deviation index indicating a deviation level between a group of the prediction confidence vector, the detection confidence vector, and the association weight matrix output from the evaluation model based on the first set and the second set, and a group of the correct prediction confidence vector, the correct detection confidence vector, and the correct association weight matrix; and the optimization means adjusts a parameter of the evaluation model based on the deviation index.

REFERENCE SIGNS LIST

10 VISUAL OBJECT TRACKING APPARATUS (VISUAL OBJECT TRACKING SYSTEM)
11 ESTIMATION UNIT
20 VISUAL OBJECT TRACKING APPARATUS (VISUAL OBJECT TRACKING SYSTEM)
21 EVALUATION UNIT
22 ESTIMATION UNIT
30 VISUAL OBJECT TRACKING APPARATUS (VISUAL OBJECT TRACKING SYSTEM)
31 DETECTOR
32 PREDICTOR
33 STORAGE UNIT
50 MACHINE LEARNING APPARATUS (MACHINE LEARNING SYSTEM)
51 DETECTION UNIT
52 PREDICTION UNIT
53 CORRECT ANSWER GENERATION UNIT
54 DEVIATION INDEX CALCULATION UNIT
55 EVALUATION MODEL
56 OPTIMIZATION UNIT
57 STORAGE UNIT

What is claimed is:

1. A visual object tracking method performed by a computer and comprising:
   receiving a first set including a plurality of predicted bounding boxes each having a corresponding object ID and a plurality of predicted feature vectors respectively corresponding to the plurality of predicted bounding boxes, and a second set including a plurality of detected bounding boxes and a plurality of detected feature vectors respectively corresponding to the plurality of detected bounding boxes;
   generating, based on the first set and the second set, a prediction confidence vector for each of the predicted bounding boxes, a detection confidence vector for each of the detected bounding boxes, and an association weight matrix, the association weight matrix including association weights respectively corresponding to pairs of the predicted bounding boxes and the detected bounding boxes; and
   estimating a plurality of estimated bounding boxes, estimated confidence vectors respectively corresponding to the estimated bounding boxes, estimated feature vectors respectively corresponding to the estimated bounding boxes, and estimated object IDs respectively corresponding to the estimated bounding boxes based on the plurality of prediction confidence vectors, the plurality of detection confidence vectors, the association weight matrix, the first set, and the second set.

2. The visual object tracking method according to claim 1, wherein
   the estimating comprises:
   determining a matching pair including a predicted bounding box and a detected bounding box matching each other, an unmatched predicted bounding box which does not match any detected bounding box, and an unmatched detected bounding box which does not match any predicted bounding box; and
   determining, for a first predicted bounding box which does not match any detected bounding box and of which a prediction confidence vector is larger than a first threshold, the first predicted bounding box, the prediction confidence vector of the first predicted bounding box, a predicted feature vector of the first predicted bounding box, and an object ID of the first predicted bounding box as the estimated bounding box, the estimated confidence vector, the estimated feature vector, and the estimated object ID, respectively.

3. The visual object tracking method according to claim 2, wherein the estimating comprises determining, for a matching pair including a second predicted bounding box and a first detected bounding box in which a prediction confidence vector of the second predicted bounding box is larger than a detection confidence vector of the first detected bounding box, the second predicted bounding box, a prediction confidence vector of the second predicted bounding box, a predicted feature vector of the second predicted bounding box, and an object ID of the second predicted bounding box as the estimated bounding box, the estimated confidence vector, the estimated feature vector, and the estimated object ID, respectively.

4. The visual object tracking method according to claim 2, wherein the estimating comprises determining, for a matching pair including a third predicted bounding box and a second detected bounding box in which a prediction confidence vector of the third predicted bounding box is smaller than a detection confidence vector of the second detected bounding box, the second detected bounding box, a detection confidence vector of the second detected bounding box, a predicted feature vector of the second detected bounding box, and an object ID of the third predicted bounding box as the estimated bounding box, the estimated confidence vector, the estimated feature vector, and the estimated object ID, respectively.

5. The visual object tracking method according to claim 2, the estimating comprises determining, for a third detected bounding box which does not match any predicted bounding box and whose detection confidence vector is larger than a second threshold, the third detected bounding box, a detection confidence vector of the third detected bounding box, a detected feature vector of the third detected bounding box, and a new object ID as the estimated bounding box, the estimated confidence vector, the estimated feature vector, and the estimated object ID, respectively.

6. A visual object tracking system comprising:
at least one memory storing instructions; and
at least one processor configured to execute the instructions to perform a process comprising:
receiving a first set including a plurality of predicted bounding boxes and a plurality of predicted feature vectors respectively corresponding to the plurality of predicted bounding boxes, and a second set including a plurality of detected bounding boxes and a plurality of detected feature vectors respectively corresponding to the plurality of detected bounding boxes, and
generating a prediction confidence vector for each of the predicted bounding boxes, a detection confidence vector for each of the detected bounding boxes, and an association weight matrix, the association weight matrix including association weights respectively corresponding to pairs of predicted bounding boxes and detected bounding boxes;
estimating a plurality of estimated bounding boxes, estimated confidence vectors respectively corresponding to the estimated bounding boxes, estimated feature vectors respectively corresponding to the estimated bounding boxes, and estimated object IDs respectively corresponding to the estimated bounding boxes based on the plurality of prediction confidence vectors, the plurality of detection confidence vectors, and the association weight matrix generated by the evaluation means, as well as the first set and the second set.

7. The visual object tracking system according to claim 6, wherein
the estimating comprises
determining a matching pair including a predicted bounding box and a detected bounding box matching each other, an unmatched predicted bounding box which does not match any detected bounding box, and an unmatched detected bounding box which does not match any predicted bounding box; and
determining, for a first predicted bounding box which does not match any detected bounding box and of which a prediction confidence vector is larger than a first threshold, the first predicted bounding box, the prediction confidence vector of the first predicted bounding box, a predicted feature vector of the first predicted bounding box, and an object ID of the first predicted bounding box as the estimated bounding box, the estimated confidence vector, the estimated feature vector, and the estimated object ID, respectively.

8. The visual object tracking system according to claim 7, wherein the estimating comprises determining, for a matching pair including a second predicted bounding box and a first detected bounding box in which a prediction confidence vector of the second predicted bounding box is larger than a detection confidence vector of the first detected bounding box, the second predicted bounding box, a prediction confidence vector of the second predicted bounding box, a predicted feature vector of the second predicted bounding box, and an object ID of the second predicted bounding box as the estimated bounding box, the estimated confidence vector, the estimated feature vector, and the estimated object ID, respectively.

9. The visual object tracking system according to claim 7, wherein the estimating comprises determining, for a matching pair including a third predicted bounding box and a second detected bounding box in which a prediction confidence vector of the third predicted bounding box is smaller than a detection confidence vector of the second detected bounding box, the second detected bounding box, a detection confidence vector of the second detected bounding box, a predicted feature vector of the second detected bounding box, and an object ID of the third predicted bounding box as the estimated bounding box, the estimated confidence vector, the estimated feature vector, and the estimated object ID, respectively.

10. The visual object tracking system according to claim 7, the estimating comprises determining, for a third detected bounding box which does not match any predicted bounding box and whose detection confidence vector is larger than a second threshold, the third detected bounding box, a detection confidence vector of the third detected bounding box, a detected feature vector of the third detected bounding box, and a new object ID as the estimated bounding box, the estimated confidence vector, the estimated feature vector, and the estimated object ID, respectively.

11. A machine learning method performed by a computer, the machine learning method for training an evaluation model for predicted bounding boxes and detected bounding boxes,
wherein the evaluation model receives a first set including a plurality of predicted bounding boxes each having a corresponding object ID and a plurality of predicted feature vectors respectively corresponding to the plurality of predicted bounding boxes, and a second set including a plurality of detected bounding boxes and a plurality of detected feature vectors respectively corresponding to the plurality of detected bounding boxes, and generates a prediction confidence vector for each of the predicted bounding boxes, a detection confidence vector for each of the detected bounding boxes, and an association weight matrix, the association weight matrix including association weights respectively corresponding to pairs of predicted bounding boxes and detected bounding boxes, and
wherein the machine learning method comprises:
obtaining the second set obtained based on a group of teacher images and the first set obtained based on a plurality of correct bounding boxes corresponding to the group of teacher images;
specifying, based on the first set and the second set, a pair of a predicted bounding box and a detected bounding box both of which match the same correct bounding box, a predicted bounding box matching a correct bounding box which does not match any detected bounding box, and a detected bounding box matching a correct bounding box which does not match any predicted bounding box;

generating a correct association weight matrix, a correct prediction confidence vector, and a correct detection confidence vector based on the specified pair, the specified predicted bounding box, and the specified detected bounding box;

calculating a deviation index indicating a deviation level between a group of the prediction confidence vector, the detection confidence vector, and the association weight matrix output from the evaluation model based on the first set and the second set, and a group of the correct prediction confidence vector, the correct detection confidence vector, and the correct association weight matrix; and adjusting a parameter of the evaluation model based on the deviation index.

\* \* \* \* \*